United States Patent
Redlich et al.

(10) Patent No.: US 12,075,388 B2
(45) Date of Patent: Aug. 27, 2024

(54) CHANNEL UTILIZATION BY APPLYING SHORT-TERM PUNCTURING

(71) Applicant: HUAWEI TECHNOLOGIES CO., LTD., Guangdong (CN)

(72) Inventors: Oded Redlich, Hod Hasharon (IL); Shimon Shilo, Hod Hasharon (IL); Jian Yu, Shenzhen (CN); Yunbo Li, Shenzhen (CN); Ming Gan, Shenzhen (CN); Genadiy Tsodik, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 352 days.

(21) Appl. No.: 17/513,712

(22) Filed: Oct. 28, 2021

(65) Prior Publication Data

US 2022/0124693 A1 Apr. 21, 2022
US 2022/0400472 A9 Dec. 15, 2022

Related U.S. Application Data

(63) Continuation of application No. PCT/EP2020/061722, filed on Apr. 28, 2020.

(30) Foreign Application Priority Data

Apr. 30, 2019 (WO) ................ PCT/CN2019/085203

(51) Int. Cl.
*H04W 4/00* (2018.01)
*H04L 5/00* (2006.01)
*H04W 72/044* (2023.01)
*H04W 74/0808* (2024.01)

(52) U.S. Cl.
CPC ......... *H04W 72/044* (2013.01); *H04L 5/0037* (2013.01); *H04W 74/0808* (2013.01)

(58) Field of Classification Search
CPC .. H04L 5/0094; H04W 72/044; H04W 72/04; H04W 72/12; H04W 72/50
See application file for complete search history.

(56) References Cited

U.S. PATENT DOCUMENTS

2019/0007180 A1* 1/2019 Shi .................. H04L 5/0007

OTHER PUBLICATIONS

Doc.: IEEE 802.11-18/1967r1, Eunsung Park et al., Overview of PHY Features for EHT, Jan. 2019, total 22 pages. XP068159645.
Doc.: IEEE 802.11-19/1190-00-0be, Oded Redlich et al., Improved Preamble Puncturing in 802.11be, Jul. 2019, total 10 pages. XP068152925.

(Continued)

*Primary Examiner* — Shantell L Heiber
(74) *Attorney, Agent, or Firm* — Fish & Richardson P.C.

(57) ABSTRACT

A signaling method and device can support channel puncturing of BW size. Embodiments provide various options for signaling methods, each of which may be suitable for supporting single-user and/or multi-user communication. A wireless network device is suitable for channel puncturing, and can include information regarding the channel puncturing in a preamble of a transmitted packet.

15 Claims, 15 Drawing Sheets

(56) References Cited

OTHER PUBLICATIONS

IEEE P802.11ax™/D2.2, "Draft Standard for Information technology—Telecommunications and information exchange between systems Local and metropolitan area networks—Specific requirements—Part 11: Wireless LAN Medium Access Control (MAC) and Physical Layer (PHY) Specifications, Amendment 6: Enhancements for High Efficiency WLAN," Feb. 2018, 620 pages.
Park et al., "Overview of PHY Features for EHT," Doc.: IEEE 802.11-18/1967r1, Jan. 2019, 22 pages.
PCT International Search Report and Written Opinion issued in International Application No. PCT/EP2020/061722 on Jul. 24, 2020, 12 pages.
Perahia, "IEEE P802.11 Wireless LANs: TGax Coexistence Assurance Document," Doc.: IEEE 802.11-16/1348r56, Jan. 2019, 7 pages.
Redlich et al., "Improved Preamble Puncturing in 802.11be," Doc.: IEEE 802.11-19/1190-00-0be, Jul. 2019, 10 pages.

\* cited by examiner

The following table suggests the new content of the BW field in MU-PPDU EHT-SIG-A

| | |
|---|---|
| 0000-0111 | Existing modes as 11ax. |
| 1000 | Puncturing in 320 MHz: is the primary 80 MHz of the preamble the primary 40MHz is present. |
| 1001 | puncturing in 320 MHz. where in the primary 80 MHz of the preamble only the secondary 20 MHz is punctured. |
| 1010 | puncturing in 320 MHz. where in the preamble: (1) The secondary 20 MHz is punctured (2) the other 20MHz channel corresponding to the same content channel of the secondary 20MHz is punctured. (3) The lowest 20 MHz channel in S80 corresponding to the same content channel is present. |
| 1011 | puncturing in 320 MHz. where in the preamble: (1) The secondary 20 MHz is punctured (2) the other 20MHz channel corresponding to the same content channel of the secondary 20MHz is punctured. (3) The highest 20 MHz channel in S80 corresponding to the same content channel is present. |
| 1100 | puncturing in 160 MHz. where in the: (1) the secondary 20 MHz is punctured (2) the other 20MHz channel corresponding to the same content channel of the secondary 20MHz is punctured (3) The lowest 20 MHz channel in S80 corresponding to the same content channel is present. |
| 1101 | puncturing in 160 MHz. where in the: (1) the secondary 20 MHz is punctured (2) the other 20MHz channel corresponding to the same content channel of the secondary 20MHz is punctured (3) The highest 20 MHz channel in S80 corresponding to the same content channel is present. |
| 1110 | puncturing in 160 MHz. where in the preamble the secondary 20MHz and all other 20MHz channels corresponding to the content channel of the secondary 20MHz are punctured. |
| 1111 | Reserved |

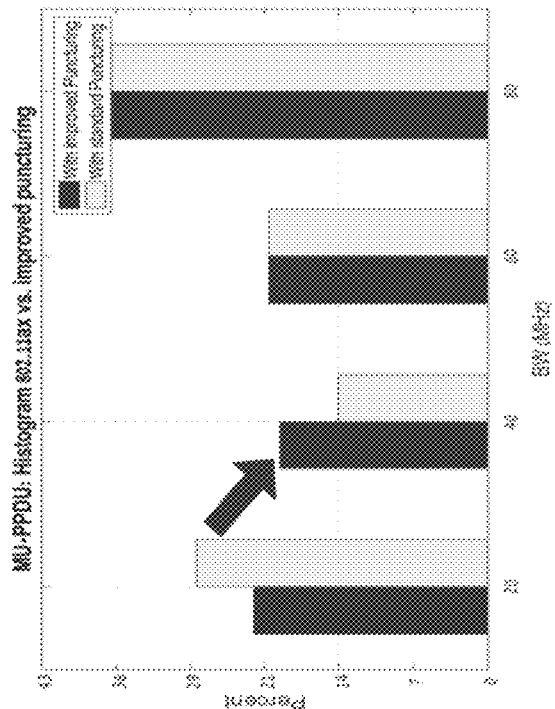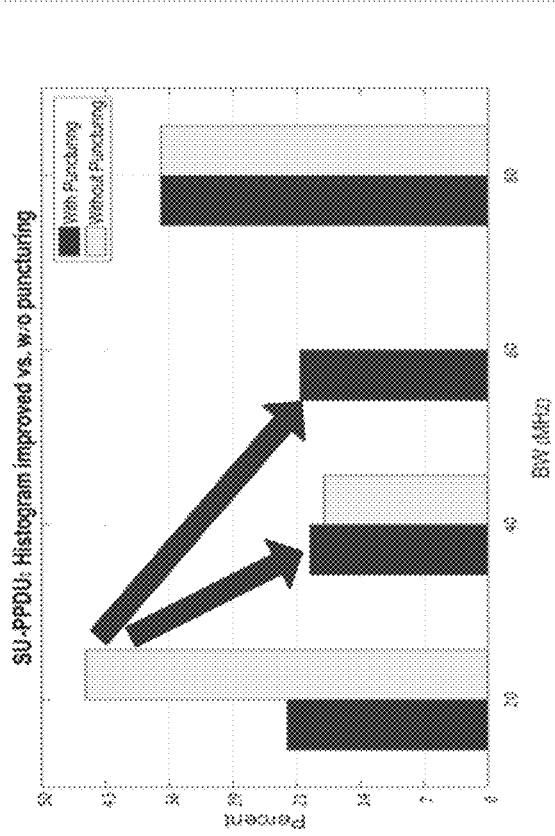
FIG. 12

CHANNEL UTILIZATION BY APPLYING SHORT-TERM PUNCTURING

CROSS-REFERENCE TO RELATED APPLICATIONS

This application is a continuation of International Application No. PCT/EP2020/061722, filed on Apr. 28, 2020, which claims priority to International Patent Application No. PCT/CN2019/085203, filed on Apr. 30, 2019. The disclosures of the aforementioned applications are hereby incorporated by reference in their entireties.

TECHNICAL FIELD

The present disclosure relates to the communications field, and in particular, to a method of improved channel utilization by applying short-term puncturing and to a corresponding wireless network device. In particular, the wireless network device is suitable for channel puncturing, and is configured to include information regarding the channel puncturing in a preamble of a transmitted packet.

BACKGROUND

In the current 802.11ax standard there are 4 options defined in the High-Efficiency (HE) Signal A (HE-SIG-A) field for Multi-User PPDU (MU-PPDU) to only use a partial channel bandwidth (BW) when a 80 MHz or a 160/80+80 MHz channel is defined. The 80 MHz channel may comprise one 80 MHz channel segment, while the 160 MHz channel may comprise two 80 MHz channel segments (80+80). Each channel segment may comprise multiple sub-channels, e.g., of 20 MHz each.

The 4 options suggest puncturing a secondary sub-channel within a primary 80 MHz channel segment (wherein the "primary 80 MHz channel segment"—e.g., referred to as P80—is the 80 MHz channel segment, in which a primary 20 MHz sub-channel is located) when either a 80 MHz or a 160 MHz channel is used. The puncturing of the non-80 MHz channel is defined later (in the Signal B (SIG-B) field, which comes right after SIG-A), see in this respect FIG. 1.

However, the current 802.11ax standard has the following disadvantages:

Firstly, there is currently no solution for a channel BW larger than 160 MHz. Secondly, in some cases, when sub-channels that contain a 2nd content channel (CT), i.e. CT #2, the CT that is not placed on the primary sub-channel, are both punctured, there is no room for this CT, so that the BW is immediately reduced to 20 MHz, as shown in FIG. 2. Thirdly, in addition, there is no solution for Single-User PPDU (SU PPDU), because the puncturing indication of the non-primary 80 MHz channel segment is placed in SIG-B, which does not exist in SU-PPDU.

SUMMARY

Embodiments of the invention are further based on the following considerations.

In the coming 802.11be standard, which is the successor of the 802.11ax standard, the channel BW is planned to be expanded to 320 MHz, and is not necessarily formed by contiguous frequency bands. The 802.11ax channel BW is limited to 160 MHz, and therefore channel aggregation and puncturing in the 802.11ax standard does not support BW larger than 160 MHz. Moreover, in some cases the puncturing method significantly limits the channel usage (see above), which makes it very non-efficient.

In addition, there is no solution for SU-PPDU puncturing in 802.11ax, therefore, the SU-PPDU is designed to be transmitted only when the entire BW is available, which is unlikely to be ever valid as the BW increases. In particular, a SU-PPDU does not include SIG-B, nor does it include signaling in the BW field in SIG-A. This means that the SU-PPDU must be transmitted in the entire available contiguous BW. If any 20 MHz sub-channel within the entire channel BW is occupied by an e.g. Overlapping Base Station Service (OBSS), a reduction in the usable BW is inevitable, as shown in FIG. 3.

In view of the above-mentioned disadvantages and considerations, embodiments of the invention aim to improve the current solutions. An objective is to provide a wireless network device and method, respectively, for improved channel puncturing. In particular, more flexible channel puncturing is desired. Further, a BW larger than 160 MHz should be supported for the channel puncturing. Moreover, the channel puncturing efficiency should generally be improved. In particular, no BW degradation should be experienced as a result of the channel puncturing. Also, the above-described CT issue is to be solved. In addition, a goal is to provide a solution for channel puncturing for SU-PPDU.

The objective is achieved by embodiments of the invention as described in the enclosed independent claims. Advantageous implementations of the embodiments of the invention are further defined in the dependent claims.

In particular, a new signaling is provided by embodiments of the invention, which signaling supports channel puncturing of BW sizes that are larger than 160 MHz—as are planned to be supported in 802.11be. Embodiments of the invention provide, in particular, several options for the new signaling, wherein each option is suitable for a different purpose. Both single-user and/or multi-user communication are supported.

A first aspect of the present disclosure provides a wireless network device for channel puncturing, the wireless network device configured to: transmit a packet over a channel, wherein the channel comprises one or more channel segments and each channel segment comprises multiple sub-channels, and wherein a preamble of the packet comprises information indicating, for transmitting the packet, the sub-channels that are used and/or the sub-channels that are punctured.

The information included in the preamble of the packet provides the new signaling mentioned above. In particular, per-packet (puncturing) signaling is enabled. The information allows a flexible indication of which sub-channel(s) is/are punctured. The included information supports channel puncturing for BW larger than 160 MHz, and supports both the multi-user communication case, e.g., MU-PPDU, as well as the single-user communication case, e.g., SU-PPDU. Thus, the wireless network device of the first aspect enables an improved channel puncturing.

In an implementation form of the first aspect, the channel comprises two, three or four 80 MHz channel segments, wherein each 80 MHz channel segment comprises four 20 MHz sub-channels.

Accordingly, BW of 160 MHz, 240 MHz, and 320 MHz are supported. Further, compatibility with the 802.11be and 802.11ax standard is provided.

In an implementation form of the first aspect, the information indicates the sub-channels that are used and/or the sub-channels that are punctured with a resolution of 20 MHz, or 40 MHz, or 80 MHz.

Thus, a flexible channel puncturing is provided. Further, high efficiency is achieved due to the high resolution.

In an implementation form of the first aspect, the packet is a physical layer conformance procedure (PLCP) protocol data unit (PPDU).

In an implementation form of the first aspect, the information is included in a Universal Signaling (U-SIG) field of the preamble of the PPDU.

In another implementation, the information could be included in the EHT-SIG field.

In an implementation form of the first aspect, the packet is a PPDU transmitted to more than one user.

Thus, multi-user communication is supported, for instance, multi-user PPDU (MU-PPDU).

A MU-PPDU may be a downlink packet, and may be used by the wireless network device, e.g. being an AP in the wireless network, to send payload for multiple users (e.g., multiple terminal devices in the wireless network). In contrast, SU-PPDU may be used by the wireless network device to send payload for a single user (e.g., terminal device in the wireless network).

In an implementation form of the first aspect, the information comprises four bits, or five bits, or six bits, or seven bits.

Thus, the information does not provide a large overhead to the packet.

In an implementation form of the first aspect, the bits indicate the sub-channels that are used and/or the sub-channels that are punctured in a 160 Mhz or 320 MHz channel.

In an implementation form of the first aspect, if all sub-channels associated with a certain content channel in the first channel segment are punctured, the bits indicate, in the second channel segment, a lowest sub-channel or a highest sub-channel that is associated with the same content channel and that is used to indicate allocations of a user within the packet.

In this way, the above-described CT issue is overcome.

In an implementation form of the first aspect, the packet is a PPDU transmitted to a single user.

Thus, single-user communication is supported, for instance, single-user PPDU (SU-PPDU).

In an implementation form of the first aspect, the information is included separate from information indicating a bandwidth, in a U-SIG field of the preamble of the PPDU.

In another implementation, the information could be included in the EHT-SIG field.

In an implementation form of the first aspect, the information comprises a bitmap.

This provides high flexibility to indicate the punctured/not-punctured sub-channels with the information.

In an implementation form of the first aspect, the bitmap comprises one of the following: 15 bits for indicating the sub-channels that are used and/or the sub-channels that are punctured with a resolution of 20 MHz in a 320 MHz channel; 8 bits for indicating the sub-channels that are used and/or the sub-channels that are punctured with a resolution of 40 MHz in a 320 MHz channel; 4 bits for indicating the sub-channels that are used and/or the sub-channels that are punctured with a resolution of 80 MHz in a 320 MHz channel; 6 bits for indicating the sub-channels that are used and/or the sub-channels that are punctured with a mixed puncturing resolution in a 320 MHz channel.

In an implementation form of the first aspect, the wireless network device is further configured to: transmit a further packet over the channel, wherein a preamble of the further packet comprises further information that indicates for transmitting the further packet, the sub-channels that are used and/or the sub-channels that are punctured, wherein the further information is different from the information.

That means, per-packet puncturing signaling is implemented, i.e., the information may be different from one transmitted packet to the next. Notably, the information may also be the same for multiple packets, e.g., consecutively transmitted packets.

A second aspect of the present disclosure provides a method for channel puncturing, the method comprising: transmitting a packet over a channel, wherein the channel comprises one or more channel segments and each channel segment comprises multiple sub-channels, and wherein a preamble of the packet comprises information indicating, for transmitting the packet, the sub-channels that are used and/or the sub-channels that are punctured.

In an implementation form of the second aspect, the channel comprises two, three or four 80 MHz channel segments, wherein each 80 MHz channel segment comprises four 20 MHz sub-channels.

In an implementation form of the second aspect, the information indicates the sub-channels that are used and/or the sub-channels that are punctured with a resolution of 20 MHz, or 40 MHz, or 80 MHz.

In an implementation form of the second aspect, the packet is a physical layer conformance procedure (PLCP) protocol data unit (PPDU).

In an implementation form of the second aspect, the information is included in a Universal Signaling (U-SIG) field of the preamble of the PPDU.

In an implementation form of the second aspect, the packet is a PPDU transmitted to more than one user.

In an implementation form of the second aspect, the information comprises four bits, or five bits, or six bits, or seven bits.

In an implementation form of the second aspect, the bits indicate the sub-channels that are used and/or the sub-channels that are punctured in a 160 Mhz or 320 MHz channel.

In an implementation form of the second aspect, if all sub-channels associated with a certain content channel in the first channel segment are punctured, the bits indicate, in the second channel segment, a lowest sub-channel or a highest sub-channel that is associated with the same content channel and that is used to indicate allocations of a user within the packet.

In an implementation form of the second aspect, the packet is a PPDU transmitted to a single user.

In an implementation form of the second aspect, the information is included separate from information indicating a bandwidth, in a U-SIG field of the preamble of the PPDU.

In an implementation form of the second aspect, the information comprises a bitmap.

In an implementation form of the second aspect, the bitmap comprises one of the following: 15 bits for indicating the sub-channels that are used and/or the sub-channels that are punctured with a resolution of 20 MHz in a 320 MHz channel; 8 bits for indicating the sub-channels that are used and/or the sub-channels that are punctured with a resolution of 40 MHz in a 320 MHz channel; 4 bits for indicating the sub-channels that are used and/or the sub-channels that are punctured with a resolution of 80 MHz in a 320 MHz channel; 6 bits for indicating the sub-channels that are used and/or the sub-channels that are punctured with a mixed puncturing resolution in a 320 MHz channel.

In an implementation form of the second aspect, the method further comprises transmitting a further packet over the channel, wherein a preamble of the further packet comprises further information that indicates for transmitting the further packet, the sub-channels that are used and/or the sub-channels that are punctured, wherein the further information is different from the information.

The method of the second aspect and its implementation forms achieve the same advantages as the wireless network device of the first aspect and its respective implementation forms.

A third aspect of the present disclosure provides a computer program comprising a program code for performing, when running on a computer, the method according to the second aspect or any implementation form thereof.

A fourth aspect of the present disclosure provides a non-transitory storage medium storing executable program code which, when executed by a processor, causes the method according to the second aspect or any of its implementation forms to be performed.

A fifth aspect of the present disclosure provides a method comprising: per packet puncturing signaling with 20 MHz resolution, specifically indicating which 20 MHz/40 MHz/80 MHz sub-channels are used.

In an implementation form of the fifth aspect, for MU-PPDU, the method further comprises transmitting the puncturing and BW signaling in U-SIG on up to 160 MHz channels: the primary 80 MHz channel segment (P80) and the secondary 80 MHz segment within the primary 160 MHz channel.

In an implementation form of the fifth aspect, for SU-PPDU, the method further comprises adding signaling for puncturing in various optional BW resolutions: 20 MHz, 40 MHz, 80 MHz or mixed BW values. The signaling shall be a bitmap according to the chosen puncturing resolution that will indicate which portions of the channel are free to use and which are busy (punctured), thus not available for use.

In an implementation form of the fifth aspect, for SU-PPDU (alternatively to the above), the method comprises using a MU-PPDU frame instead in order to leverage its already existing puncturing signaling.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which

FIG. 6 shows a solution for the CT issue, in an embodiment of the invention.

FIG. 12 shows simulation results for a 20 MHz puncturing resolution.

DETAILED DESCRIPTION OF EMBODIMENTS

Figure 1:
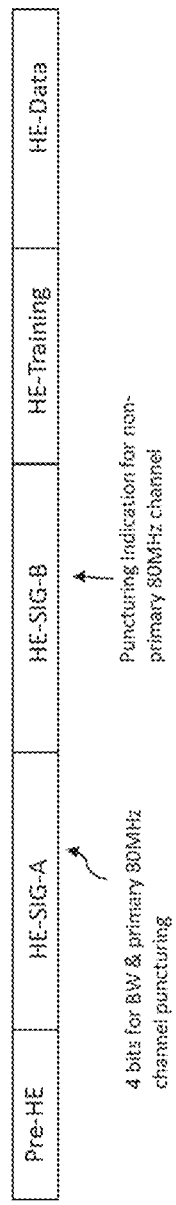
FIG. 1 shows a current BW and a puncturing indication in the 802.11ax standard for MU-PPDU.
Figure 2:
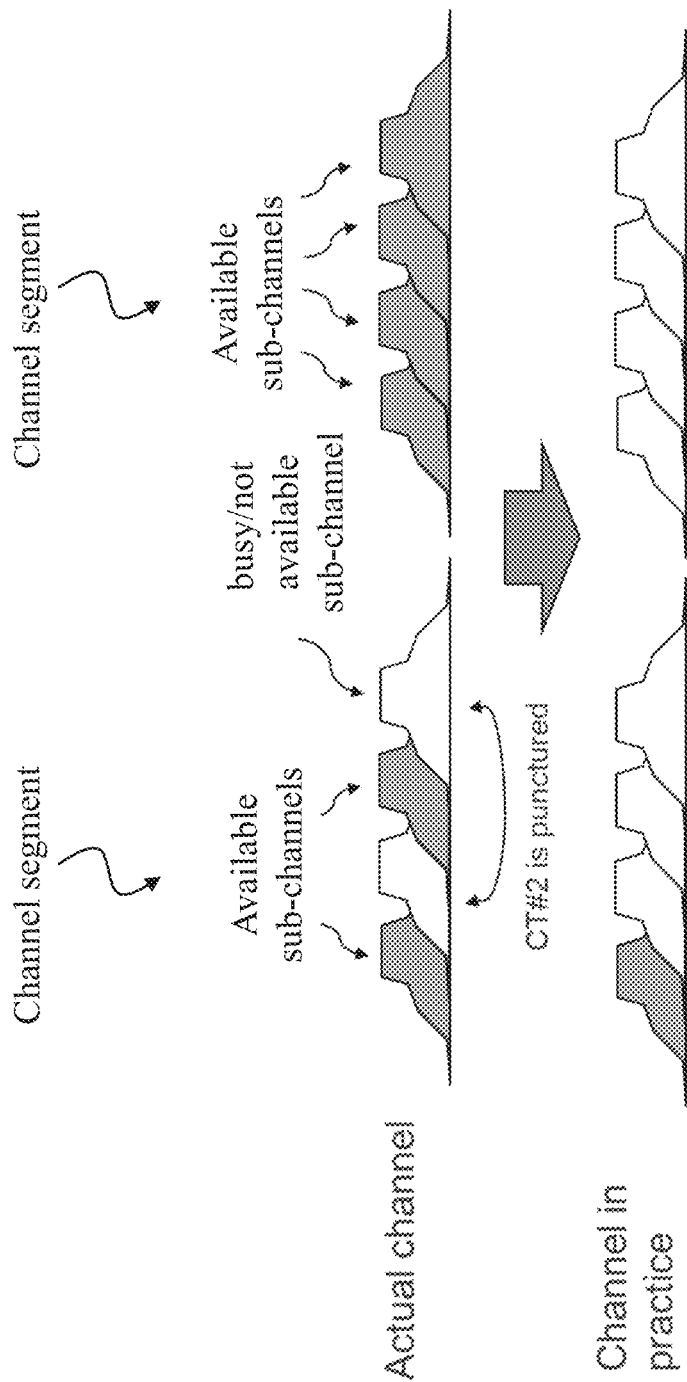
FIG. 2 shows a case where CT #2 is punctured. In particular, the figure illustrates the CT issue.
Figure 3:
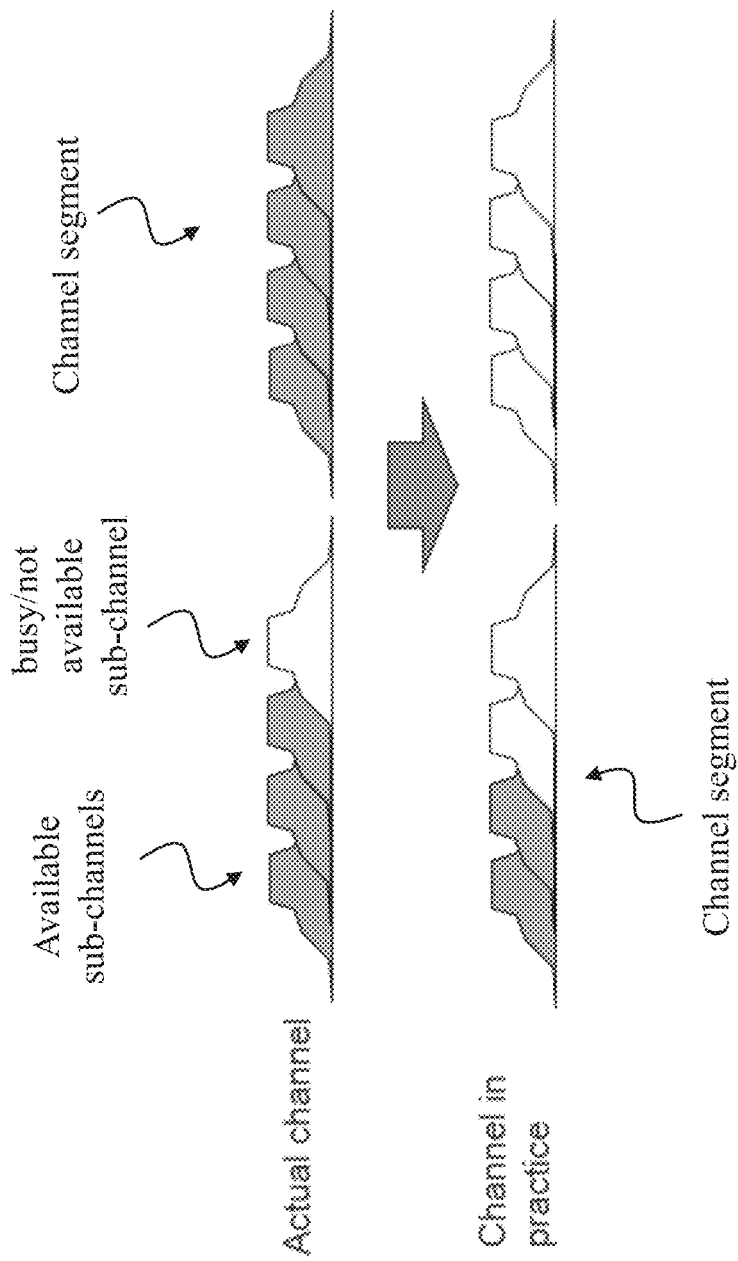
FIG. 3 shows BW reduction in case of an occupied sub-channel for SU-PPDU.
Figure 4:
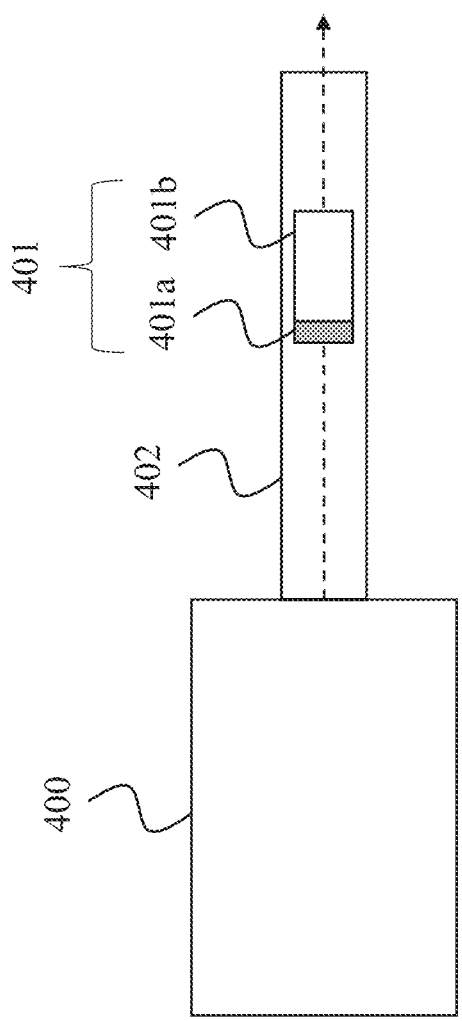
FIG. 4 shows a wireless network device according to an embodiment of the invention.
Figure 5:
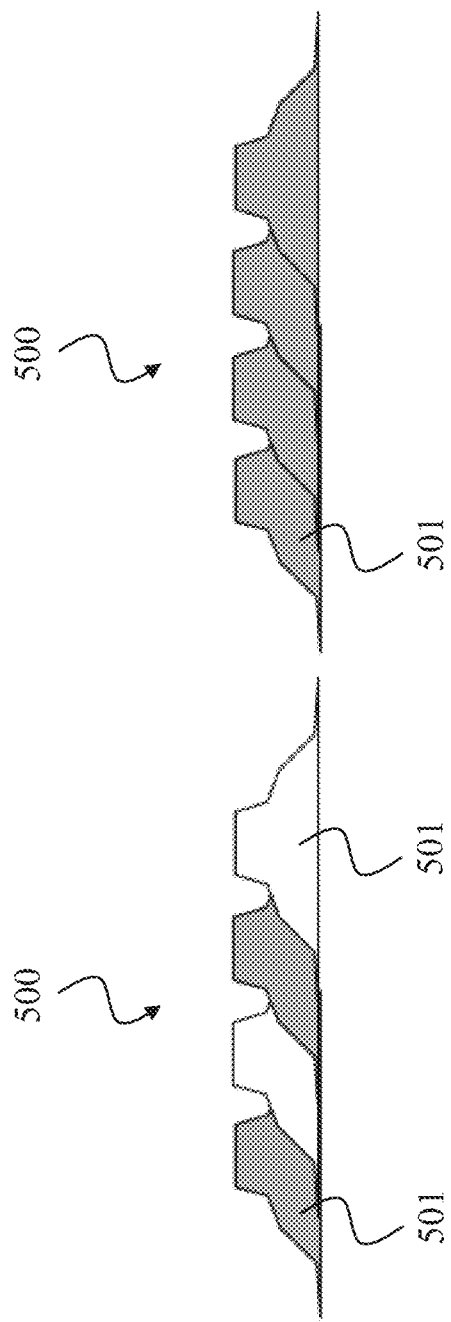
FIG. 5 shows a channel (with channel segments and sub-channels) that is used by a wireless network device according to an embodiment of the invention.

FIGS. 4 and 5 illustrate a wireless network device 400 for channel puncturing according to an embodiment of the invention. The wireless network device 400 may be an access point (AP) or a terminal device in a wireless network, e.g., a device/network according to the 802.11be or 802.11ax standard. That is, the wireless network device 400 may be a Wi-Fi device.

The wireless network device 400 is configured to transmit a packet 401 over a (wireless) channel 402, e.g., to a terminal device or AP in the wireless network. The channel 402 comprises one or more channel segments 500 and each channel segment 500 comprises multiple sub-channels 501. For instance, a channel segment 500 may have a BW of 80 MHz, and a sub-channel 501 may have a BW of 20 MHz. The channel 402 may include 2, 3 or 4 channel segments 500.

Notably, here the notation "channel" (overall BW), "channel segment" (logical separation of the channel BW), and "sub-channel" (smallest frequency resource in the channel) are used. However, other notations may be used in the art. For instance, sometimes a "channel" having an overall BW of 160 MHz is described to have a primary 80 MHz "channel" (P80) and a secondary 80 MHz "channel" (S80), each having multiple 20 MHz "channels". In the notation of the present disclosure, this would translate to an overall "channel" of 160 MHz having a primary 80 MHz "channel segment" (P80) and a secondary 80 MHz "channel segment" (S80), each having multiple 20 MHz "sub-channels". Both notations result the same technical result. Thus, embodiments of the invention should not be limited by the used notation.

A preamble 401a of the packet 401 comprises information indicating, for transmitting the packet 401, the sub-channels 501 that are used and/or the sub-channels 501 that are punctured. The information may be referred to as "puncturing information" or "puncturing signaling". A receiver of the packet 401 can obtain the information, and can derive from the information in the packet 401, in which channel segments 500 and/or sub-channels 501 the payload in the packet 401 can be obtained. The preamble of the packet 401 may be transmitted over a determined sub-channel 501 of a determined channel segment 500.

The preamble 401a of the packet 401 may comprise one or more fields, e.g., SIG-A, SIG-B or U-SIG, wherein the puncturing information may be included in one of these preamble fields. Additionally, the preamble 401a of the packet 401 may comprise information indicating a BW. The information indicating the BW and the puncturing information may be combined.

The wireless network device 400 may comprise a processor or processing circuitry (not shown) configured to perform, conduct or initiate the various operations of the wireless network device 400 described herein. The processing circuitry may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors.

The wireless network device 400 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the first network entity 100 and/or second network entity 101 to be performed.

In one embodiment, the processing circuitry comprises one or more processors and a non-transitory memory connected to the one or more processors. The non-transitory memory may carry executable program code which, when executed by the one or more processors, causes the wireless network device 400 to perform, conduct or initiate the operations or methods described herein.

In an embodiment of the invention, for MU-PPDU, to support a BW>160 MHz, the BW and puncturing field in SIG-A of the preamble 401a of the packet 401 may be expanded from 3 bits (as defined in 802.11ax) to 4 bits, therefore allowing more options to define various cases in such BWs (e.g., 240 MHz or 320 MHz). This is shown in FIG. 6.

In particular, the information may comprise four bits 600 (see FIG. 6), or five bits, or six bits, or seven bits. The bits 600 may indicate the sub-channels 501 that are used and/or the sub-channels that are punctured in a 160 Mhz or 320 MHz channel 402. In FIG. 6, the four bits 600 are shown as an example to define the BW and the puncturing information. Thereby, the range of the four bits 600 being 0000-0111 may define existing modes in the 802.11ax standard. Further, as example:

The four bits 600 being "1000" may define puncturing in a BW of 320 MHz. In particular, in the primary 80 MHz channel segment 500 a primary 40 MHz sub-channel 501 is present.

The four bits 600 being "1001" may define puncturing in a BW of 320 MHz, wherein in the primary 80 MHz channel segment 500, only the secondary 20 MHz sub-channel 501 is punctured.

The four bits 600 being "1010" may define puncturing in 320 MHz, wherein in the primary 80 MHz channel segment 500 (P80) the secondary 20 MHz sub-channel 501 is punctured, the other 20 MHz sub-channel 501 corresponding to the same CT of the secondary 20 MHz is punctured, and the lowest 20 MHz sub-channel in the secondary 80 MHz channel segment 500 (S80) corresponding to the same CT is present. This may address the CT issue.

The four bits 600 being "1011" may define puncturing in 320 MHz, wherein in the primary 80 MHz channel segment 500 (P80), the secondary 20 MHz sub-channel 501 is punctured, the other 20 MHz sub-channel 501 corresponding to the same CT of the secondary 20 MHz is punctured, and the highest 20 MHz sub-channel 501 in the secondary channel segment 500 (S80) corresponding to the same CT is present. This may address the CT issue.

The four bits 600 being "1100" may define puncturing in 160 MHz, wherein the secondary 20 MHz sub-channel 501 in the primary channel segment 500 (P80) is punctured, and the other 20 MHz sub-channel 501 corresponding to the same CT of the secondary 20 MHz is punctured, and the lowest 20 MHz sub-channel in the secondary channel segment (S80) corresponding to the same CT is present. This may address the CT issue.

The four bits 600 being "1101" may define puncturing in 160 MHz, wherein the secondary 20 MHz sub-channel 501 in the primary channel segment 500 (P80) is punctured, the other 20 MHz channel corresponding to the same CT of the secondary 20 MHz is punctured, and the highest 20 MHz sub-channel 501 in the secondary channel segment (S80) corresponding to the same content channel is present. This may address the CT issue.

The four bits 600 being "1110" may define puncturing in 160 MHz, wherein in the primary channel segment 500, the secondary 20 MHz sub-channel 501 and all other 20 MHz sub-channels 501 corresponding to the CT of the secondary 20 MHz sub-channel 501 are punctured.

The four bits 600 being "1111" may be reserved.

Figure 7:
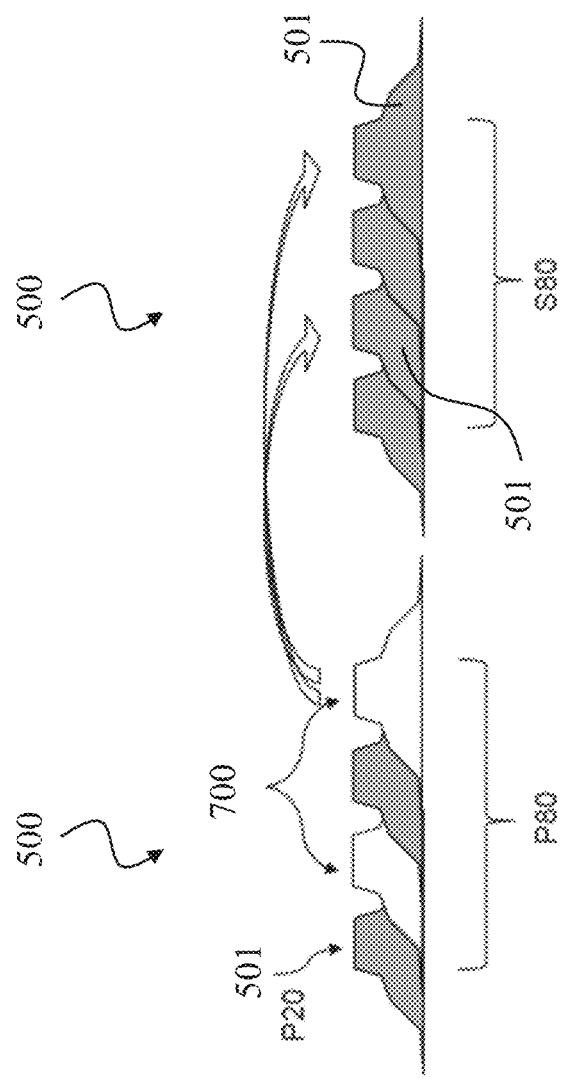
FIG. 7 shows a solution for the CT issue, in an embodiment of the invention.
Figure 8:
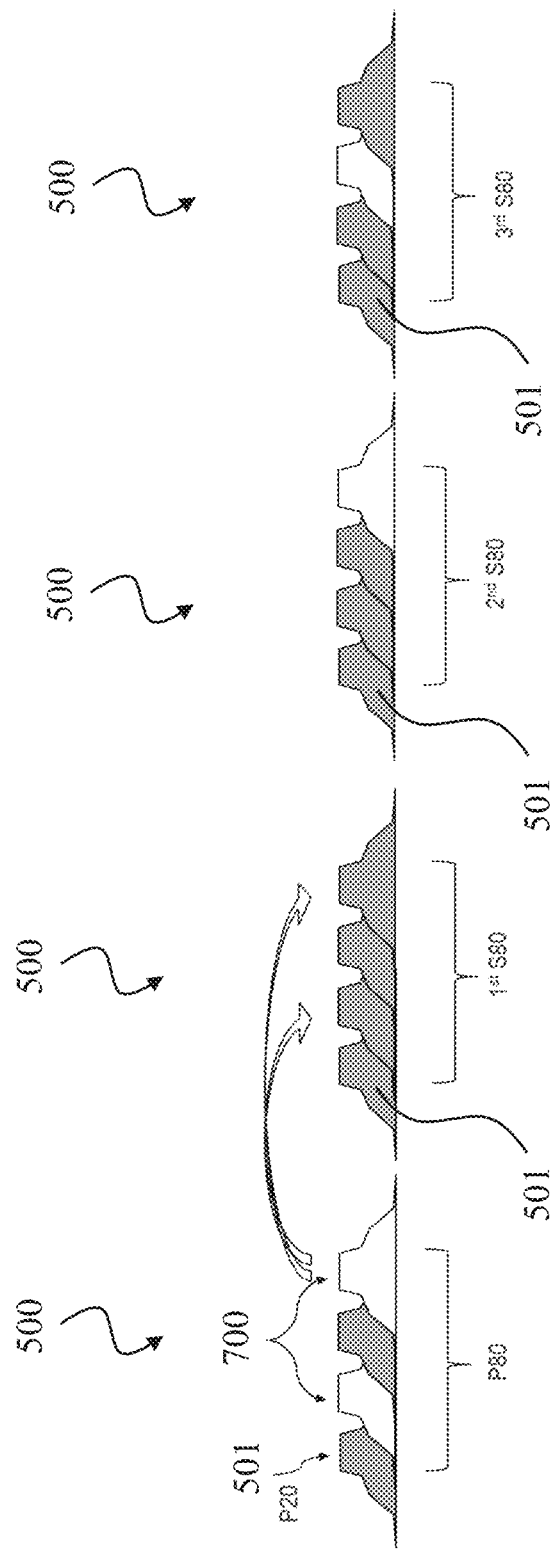
FIG. 8 shows bits indicating BW and puncturing information in an embodiment of the invention, for multi-user communication (e.g., MU-PPDU).

FIG. 7 and FIG. 8 illustrate embodiments of the invention that solve the CT issue, i.e., the case where both sub-channels 501 of the $2^{nd}$ CTs in the primary 80 MHz channel segment 500 (P80) are punctured. The information of these CT that are transmitted in the secondary 80 MHz channel segment 500 (S80) may be used (as depicted in FIG. 7 (for 160 MHz channel 402) and FIG. 8 (for 320 MHz channel 402), respectively).

The indication of which 20 MHz sub-channel 501 to use for this purpose may be signaled by the bits 600 in the BW field, e.g., in SIG-A, as shown in FIG. 6.

Figure 9:
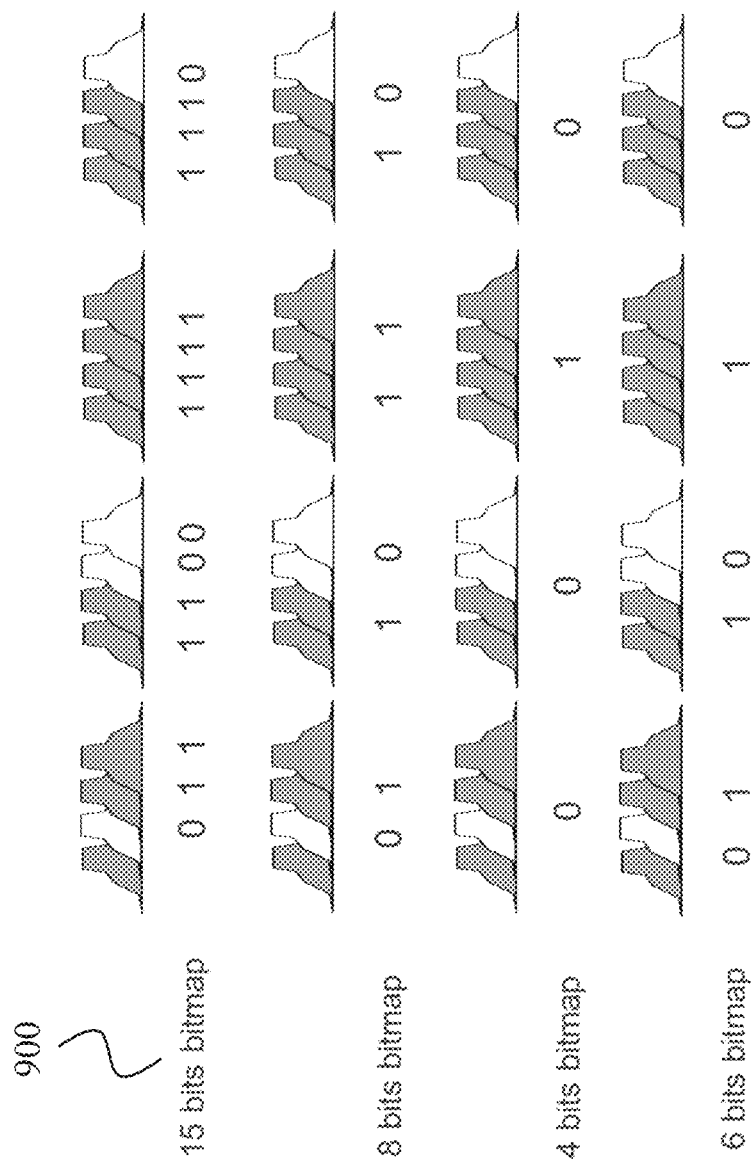
FIG. 9 shows a bitmap indicating puncturing information in an embodiment of the invention, for single-user communication (e.g., SU-PPDU).

FIG. 9 illustrates that, in order to solve the case of channel puncturing for SU-PPDU transmission, puncturing signaling using one of the following methods may be added:

A bitmap 900 of the punctured sub-channels 501 may be added to SIG-A or U-SIG. The bitmap 900 may be defined in various ways, wherein one of these ways is depicted in FIG. 9 and described below. In particular:

15 bits for 20 MHz puncturing resolution in 320 MHz.
8 bits for 40 MHz puncturing resolution in 320 MHz.
4 bits for 80 MHz puncturing resolution in 320 MHz.
6 bits for mixed channel width puncturing resolution in 320 MHz.

Another way to define the bitmap 900 may be to use a combine signaling of BW (3 bits) and a BW-dependent bitmap (e.g., the BW field may be expanded to 3 bits relative to 802.11ax to support 320 MHz). In this case the signaling for a BW of 320 MHz may require some more overhead than the previous way, however, the signaling for smaller BWs may be smaller as well. For instance:

- 15 bits for 20 MHz puncturing resolution in 320 MHz+3 bits for BW
- 8 bits for 40 MHz puncturing resolution in 320 MHz+3 bits for BW.
- 12 bits for 20 MHz puncturing resolution in 240 MHz+3 bits for BW
- 6 bits for 40 MHz puncturing resolution in 240 MHz+3 bits for BW.
- 8 bits for 20 MHz puncturing resolution in 160 MHz+3 bits for BW.
- 4 bits for 40 MHz puncturing resolution in 160 MHz+3 bits for BW.
- 4 bits for 20 MHz puncturing resolution in 80 MHz+3 bits for BW.

Another way to define the bitmap 900 is to use a combined signaling of BW (3 bits) and a constant-length bitmap 900. In this case the puncturing resolution is BW-dependent. Here, the signaling overhead may be again higher for BW=320 MHz, but lower for smaller BWs. For example, either 7 or 11 signaling bits may be used. For instance:

- 4 bits for a BW of 320 MHz with 80 MHz puncturing resolution+3 bits for BW
- 4 bits for a BW of 160 MHz with 40 MHz puncturing resolution+3 bits for BW
- 4 bits for a BW of 80 MHz with 20 MHz puncturing resolution+3 bits for BW
- 8 bits for a BW of 320 MHz with 40 MHz puncturing resolution+3 bits for BW
- 8 bits for a BW of 160 MHz with 20 MHz puncturing resolution+3 bits for BW The bitmap(s) 900 suggested above may be added to SIG-A, either at the expense of current (i.e., 802.11ax) fields, or in a new SIG-A symbol that will be added (concatenated) to the existing SIG-A. In case a new symbol is added, an additional flag bit may be added to SIG-A, to indicate whether a new symbol is added or not. Alternatively, the bitmap(s) 900 may also be added to U-SIG.

The above-described embodiments, i.e., the new signaling method enable the wireless network device 400 to support receiving and/or transmitting signals of up to 320 MHz with channel puncturing flexibility. This means that even if a wide channel 402 is partially occupied by some interfering signals, the wireless network device 400 can still be able to communicate on the available channel (i.e., using the available sub-channels 501) with another wireless network device. Moreover, a wireless network device 400 that supports the suggested method will be able to receive and/or transmit signals that are spread on non-contiguous sub-channels 501, for instance, for up to 4 channel segments 500 of 80 MHz BW each.

In the following, a NS-3 simulation setup for simulating embodiments of the invention is described. Several system level simulation scenarios were created, in which the Base Station Service (BSS) AP (which is the "AP under test") is located near several OBSS transmitters. It is not important whether the OBSS transmitters are APs or non-Aps because what is important is the channel utilization rate of each device. The following parameters were defined in each scenario:

- Number of OBSS APs, each serves 1-3 clients.
- Average load time percentage (a theoretical number: the % of time that the OBSS transmits assuming it is the only existing transmitter).
- BW of each OBSS device (20 MHz or 40 MHz).
- BSS BW capability (either 80 MHz or 160 MHz).
- A single primary channel per BSS (multi-primary ideas are OOS).
- No disallowed channels.
- UDP DL transmission.

Then it was counted how many times there were free channel portions that were not used.

Figure 10:
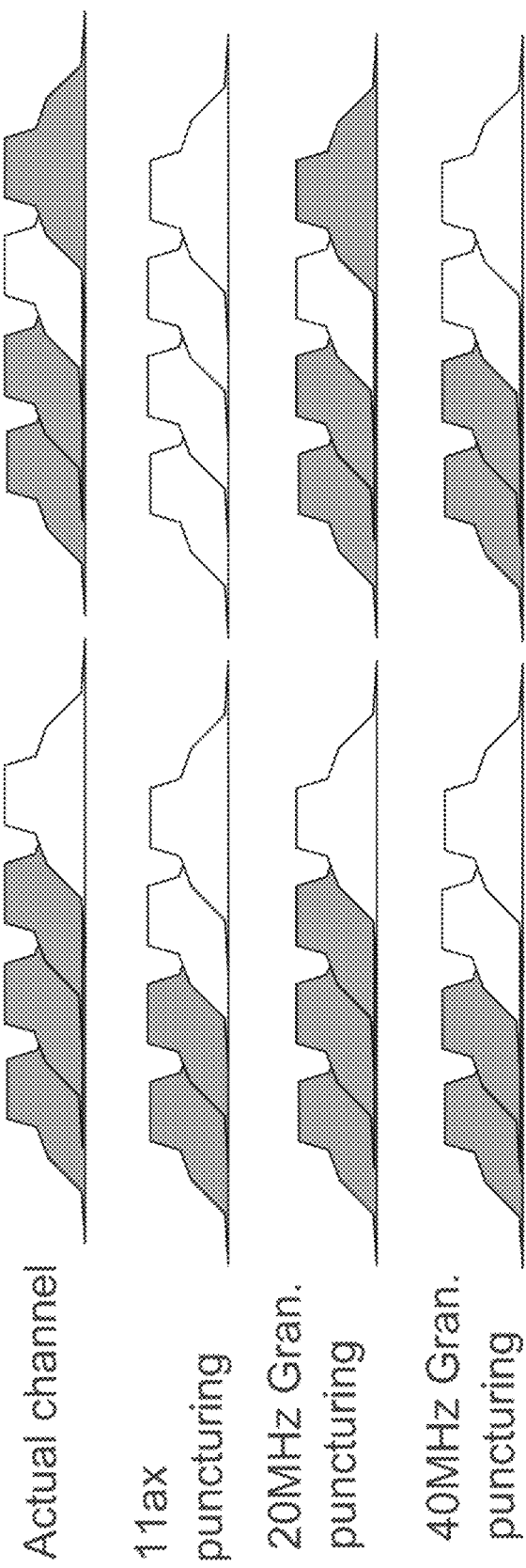
FIG. 10 illustrates a simulation setup, particularly a puncturing granularity.

FIG. 10 shows a simulation setup, particularly illustrates puncturing granularity. Puncturing granularity may be 20 MHz, 40 MHz or 80 MHz. There is a tradeoff: channel utilization efficiency vs. signaling overhead. 20 MHz granularity may require more overhead bits, therefore it was examined and used as a bound for channel utilization. 40 MHz may be the best compromise between the tradeoff parameters.

Figure 11:
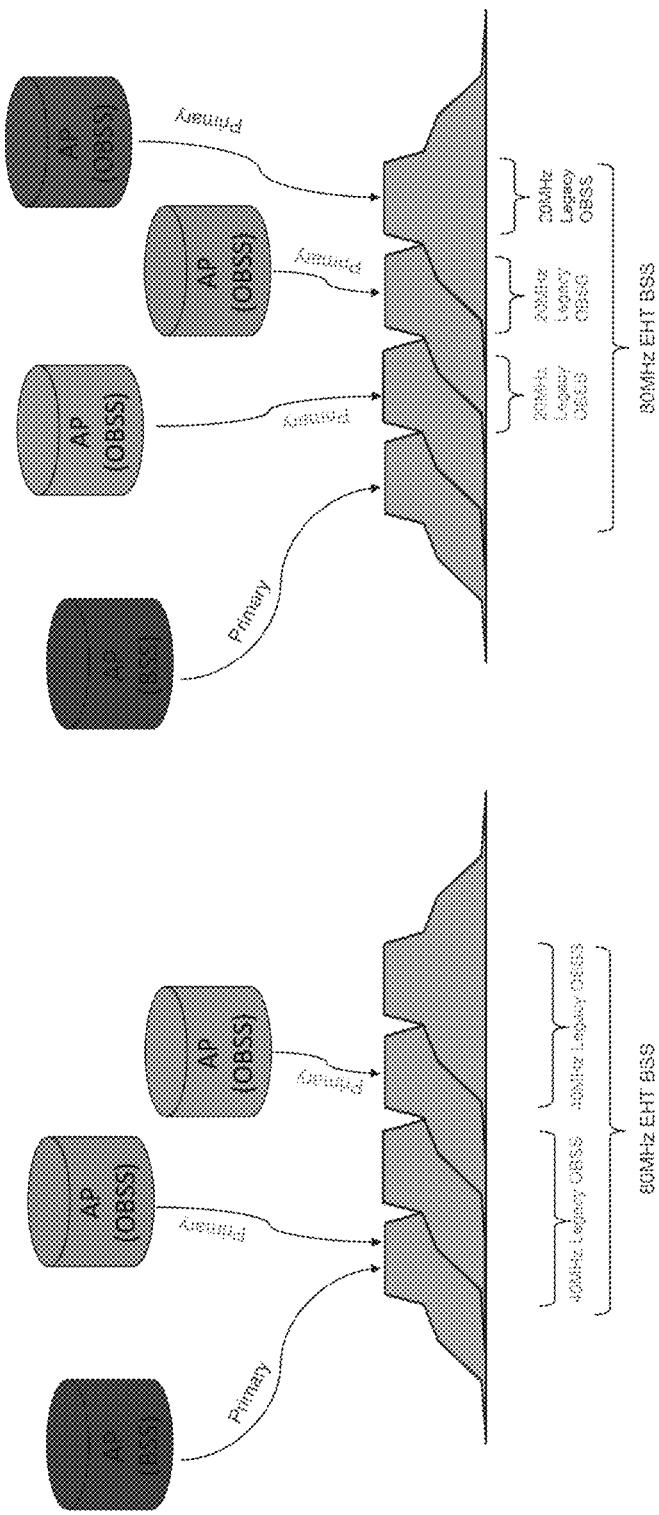
FIG. 11 illustrates a simulation setup for a 80 MHz scenario.

FIG. 11 shows a simulation setup for an 80 MHz scenario, in which APs (BSS) and other APs (OBSS) interfere.

FIG. 12 shows simulation results for a 20 MHz resolution. In each BSS-AP transmission, the BW (20, 40 or 80 MHz) was chosen according to a CCA result, while not applying puncturing (as in SU-PPDU). Then the average BW over time was computed ($6^{th}$ column of the table). Further, in each BSS-AP transmission, the BW was chosen according to CCA result while applying preamble-puncturing. Then the average BW over time was computed ($7^{th}$ column of the table). Further, in each BSS-AP transmission, the BW was chosen according to a CCA result while applying improved preamble-puncturing. Then the average BW over time was computed ($8^{th}$ column of the table). The % of time that the OBSS transmits assumes it is the only existing transmitter (see $5^{th}$ column of the table).

The % of increased BW ($9^{th}$ column of the table) shows a left number—SU-PPDU: improved puncturing vs. no puncturing—and a right number—MU-PPDU: improved puncturing vs. 11ax puncturing. Due to "better" puncturing, some of the 20 MHz allocations were increased to 40 MHz or 60 MHz. Channel utilization gain is visible.

Figure 13:
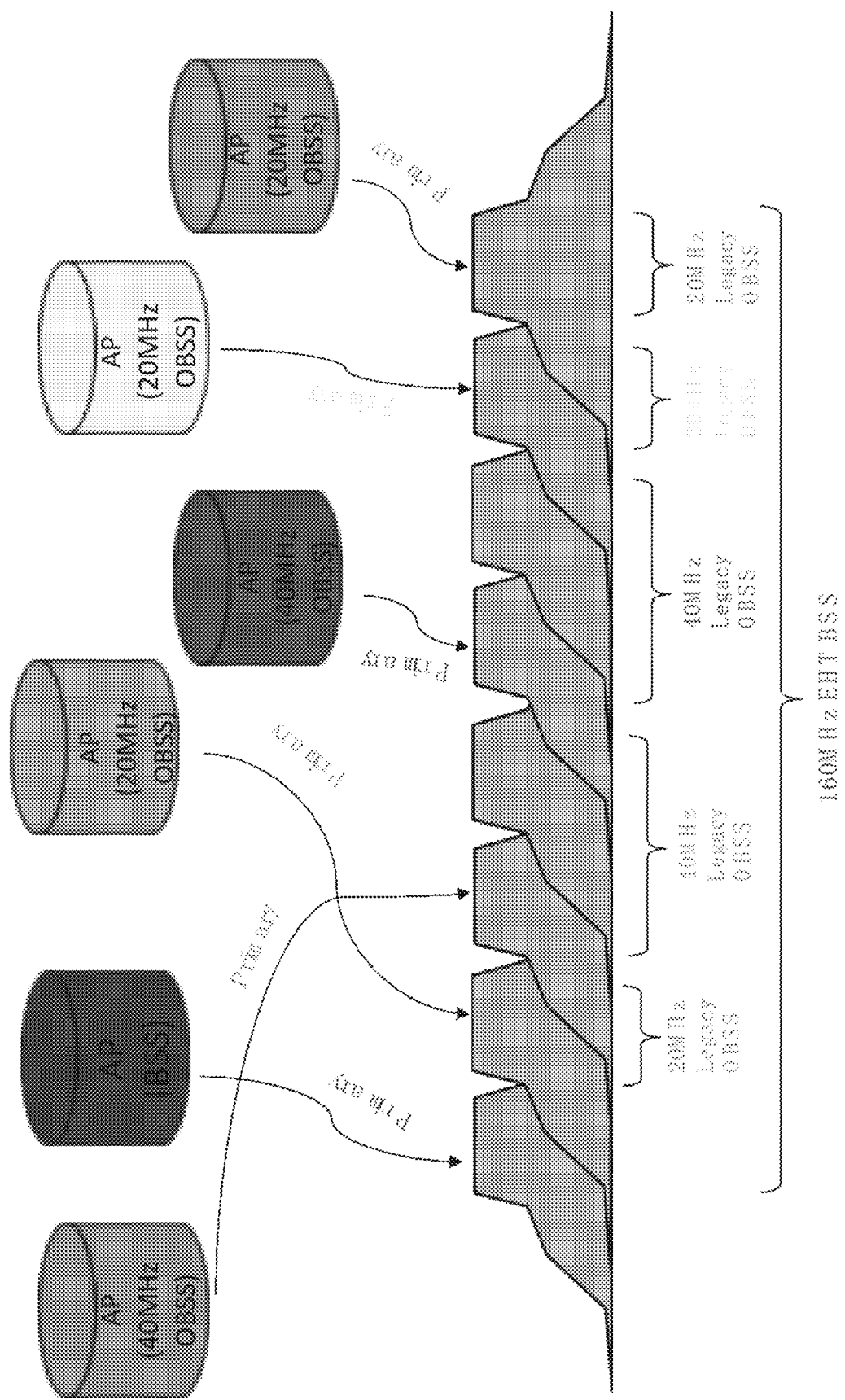
FIG. 13 illustrates a simulation setup for a 160 MHz scenario.

FIG. 13 shows a simulation setup in a 160 MHz scenario, in which APs (BSS) and other APs (OBSS) interfere.

Figure 14:
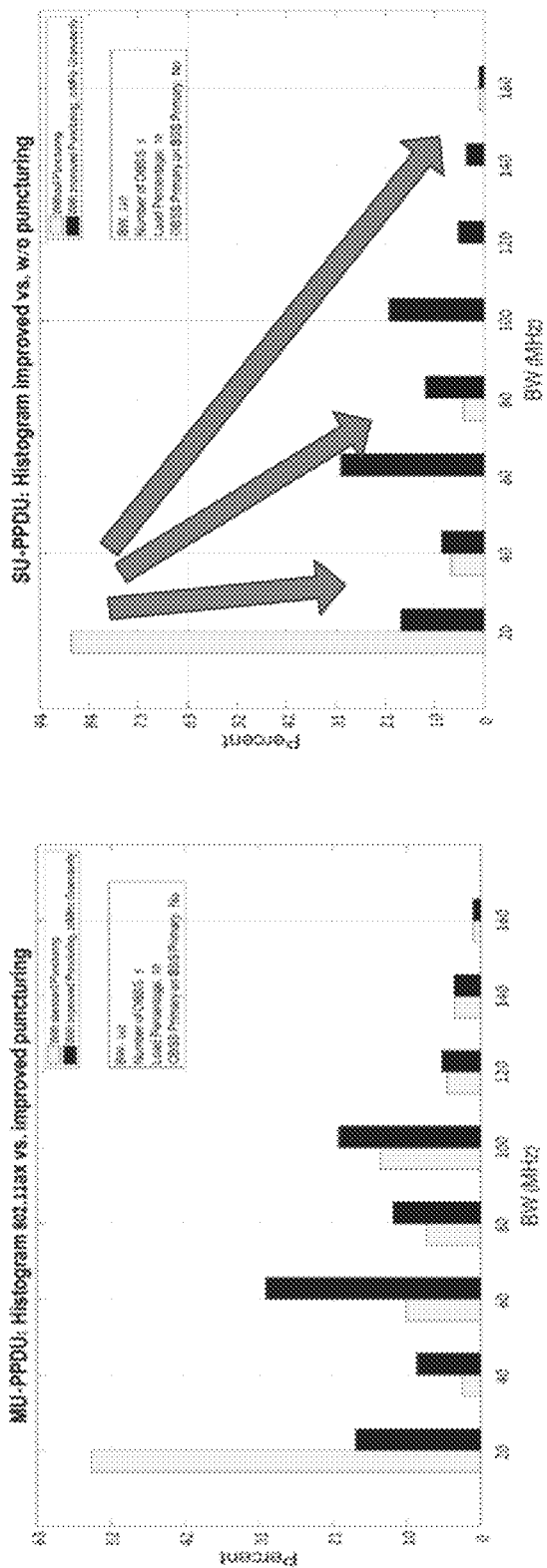
FIG. 14 shows simulation results for a 20 MHz puncturing resolution.

FIG. 14 shows simulation results for a 20 MHz puncturing resolution. The simulation results show significant improvement in channel utilization.

Signaling for SU-PPDU may require 15 bits, which is the maximum number of 20 MHz RUs in a 320 MHz BW. For MU-PPDU, 13 bits are required, if the 2 puncturing bits in the BW field in SIG-A are omitted (which are unnecessary now). A puncturing granularity of 20 MHz may allow many allocation options.

Figure 15:
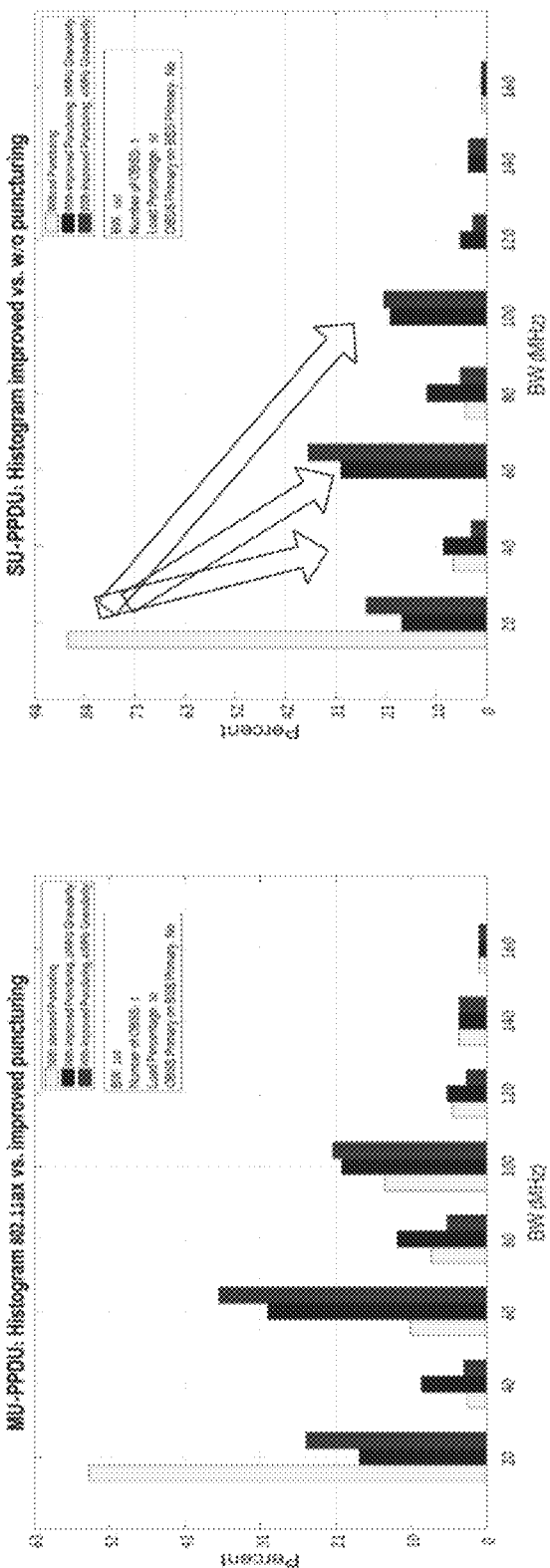
FIG. 15 shows simulation results for a 40 MHz puncturing resolution.

FIG. 15 shows simulation results for a 40 MHz puncturing resolution. Channel utilization gain is still significant enough when puncturing granularity is increased from 20 MHz to 40 MHz. The simulation results show, in particular, that the improvement in channel utilization is not far from improvement achieved when using 20 MHz granularity. The signaling for SU-PPDU may require 8 bits, which is the maximum number of 40 MHz RUs in a 320 MHz BW (plus one 20 MHz RU—the adjacent to P20). For MU-PPDU, 6 bits are required, if the 2 puncturing bits in the BW field in SIG-A are omitted (which are unnecessary now). A cost is much lower than a cost required for 20 MHz granularity.

Overall, the simulation results show significant improvement in channel utilization when puncturing is applied, especially in the SU-PPDU case.

In summary of this disclosure, the 802.11ax standard preamble puncturing mechanism is far from optimal. In particular, the lack of puncturing in SU-PPDU makes the channel utilization significantly sub-optimal. The channel utilization can be improved by modifying the puncturing signaling in MU-PPDU, and by adding puncturing signaling in SU-PPDU.

By modifying the puncturing signaling in MU-PPDU, a fair gain in channel utilization is achieved for a BW of 80 MHz and a dramatic gain is achieved for a BW of 160 MHz. It is assumed that for BW larger than 160 MHz, the improvement will be even more significant. By keeping the puncturing mechanism similar to 802.11ax, with only some minor modifications, and by increasing the overhead by only 1 bit, the channel utilization for MU-PPDU may be improved. Further, by adding puncturing signaling to SU-PPDU and by allowing the use of non-contiguous RUs, the channel utilization for SU-PPDU can be significantly improved.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A wireless network device for channel puncturing, the wireless network device comprising:
   at least one processor; and
   a non-transitory computer-readable storage medium coupled to the at least one processor and storing programming instructions for execution by the at least one processor, wherein the programming instructions instruct the wireless network device to:
   transmit a packet over a channel,
   wherein the channel comprises one or more channel segments and each channel segment comprises multiple sub-channels, and
   wherein:
   a preamble of the packet comprises information indicating, for transmitting the packet, at least one of the sub-channels that are used or the sub-channels that are punctured,
   the information comprises a plurality of bits,
   the one or more channel segments comprise a first channel segment and a second channel segment, and
   the wireless network device is operable such that if all sub-channels associated with a certain content channel in the first channel segment are punctured, the bits indicate, in the second channel segment, a lowest sub-channel or a highest sub-channel that is associated with the same content channel and that is used to indicate allocations of a user within the packet.

2. The wireless network device according to claim 1, wherein:
   the channel comprises two, three or four 80 MHz channel segments, wherein each 80 MHz channel segment comprises four 20 MHz sub-channels.

3. The wireless network device according to claim 1, wherein:
   the information indicates the sub-channels that are used and/or the sub-channels that are punctured with a resolution of 20 MHz, or 40 MHz, or 80 MHz.

4. The wireless network device according to claim 1, wherein the packet is a physical layer conformance procedure (PLCP) protocol data unit (PPDU).

5. The wireless network device according to claim 4, wherein:
   the information is included in a Universal Signaling (U-SIG) field of a preamble of the PPDU.

6. The wireless network device according to claim 1, wherein:
   the packet is a protocol data unit (PPDU) transmitted to more than one user.

7. The wireless network device according to claim 6, wherein:
   the information comprises four bits, or five bits, or six bits, or seven bits.

8. The wireless network device (400) according to claim 7, wherein:
   the bits indicate at least one of (i) the sub-channels that are used or (ii) the sub-channels that are punctured, in a 160 Mhz or 320 MHz channel.

9. The wireless network device according to claim 1, wherein:
   the packet is a protocol data unit (PPDU) transmitted to a single user.

10. The wireless network device according to claim 9, wherein:
    the information is included separate from information indicating a bandwidth, in a Universal Signaling (U-SIG) field of the preamble of the PPDU.

11. The wireless network device according to claim 9, wherein the information in the preamble of the packet comprises a bitmap.

12. The wireless network device according to claim 11, wherein the bitmap comprises one of the following:
    15 bits for indicating at least one of (i) the sub-channels that are used or (ii) the sub-channels that are punctured, with a resolution of 20 MHz in a 320 MHz channel;
    8 bits for indicating at least one (i) the sub-channels that are used or (ii) the sub-channels that are punctured, with a resolution of 40 MHz in a 320 MHz channel;
    4 bits for indicating at least one of (i) the sub-channels that are used or (ii) the sub-channels that are punctured, with a resolution of 80 MHz in a 320 MHz channel; or
    6 bits for indicating at least one of (i) the sub-channels that are used or (ii) the sub-channels that are punctured, with a mixed puncturing resolution in a 320 MHz channel.

13. The wireless network device according to claim 1, wherein the programming instructions further instruct the wireless network device to:
    transmit a further packet over the channel,
    wherein a preamble of the further packet comprises further information that indicates, for transmitting the further packet, at least one of the sub-channels that are used or the sub-channels that are punctured,
    wherein the further information is different from the information in the preamble of the packet.

14. A method for channel puncturing, the method comprising:
    transmitting a packet over a channel,
    wherein the channel comprises one or more channel segments, and each channel segment comprises multiple sub-channels, and
    wherein:

a preamble of the packet comprises information indicating, for transmitting the packet, at least one of the sub-channels that are used or the sub-channels that are punctured, the information comprises a plurality of bits, the one or more channel segments comprise a first channel segment and a second channel segment, and when all sub-channels associated with a certain content channel in the first channel segment are punctured, the bits indicate, in the second channel segment, a lowest sub-channel or a highest sub-channel that is associated with the same content channel and that is used to indicate allocations of a user within the packet.

15. One or more tangible, non-transitory, computer-readable media storing instructions that, when executed by one or more processors, cause the one or more processors to perform operations comprising:

transmitting a packet over a channel, wherein the channel comprises one or more channel segments, and each channel segment comprises multiple sub-channels, and wherein:

a preamble of the packet comprises information indicating, for transmitting the packet, at least one of the sub-channels that are used or the sub-channels that are punctured, the information comprises a plurality of bits, the one or more channel segments comprise a first channel segment and a second channel segment, and when all sub-channels associated with a certain content channel in the first channel segment are punctured, the bits indicate, in the second channel segment, a lowest sub-channel or a highest sub-channel that is associated with the same content channel and that is used to indicate allocations of a user within the packet.

* * * * *

UNITED STATES PATENT AND TRADEMARK OFFICE
CERTIFICATE OF CORRECTION

| | |
|---|---|
| PATENT NO. | : 12,075,388 B2 |
| APPLICATION NO. | : 17/513712 |
| DATED | : August 27, 2024 |
| INVENTOR(S) | : Oded Redlich et al. |

It is certified that error appears in the above-identified patent and that said Letters Patent is hereby corrected as shown below:

On the Title Page

In Column 1 item (30) (Foreign Application Priority Data), In Line 1, Delete "(WO)" and insert -- (CN) --.

Signed and Sealed this
Nineteenth Day of November, 2024

Katherine Kelly Vidal
*Director of the United States Patent and Trademark Office*